(12) United States Patent
Takada et al.

(10) Patent No.: US 11,267,442 B2
(45) Date of Patent: Mar. 8, 2022

(54) VEHICULAR AUTHENTICATION DEVICE AND VEHICULAR AUTHENTICATION METHOD

(71) Applicants: TOYOTA JIDOSHA KABUSHIKI KAISHA, Toyota (JP); KABUSHIKI KAISHA TOKAI-RIKA-DENKI-SEISAKUSHO, Aichi-ken (JP)

(72) Inventors: Naoyuki Takada, Toyota (JP); Yasuhisa Ohta, Toyota (JP); Yuya Goto, Toyota (JP); Takahiko Ando, Niwa-gun (JP); Yosuke Ohashi, Niwa-gun (JP); Rijin Owaki, Niwa-gun (JP); Daisuke Ogawa, Niwa-gun (JP)

(73) Assignees: TOYOTA JIDOSHA KABUSHIKI KAISHA, Toyota (JP); KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 0 days.

(21) Appl. No.: 16/780,037

(22) Filed: Feb. 3, 2020

(65) Prior Publication Data

US 2020/0307519 A1  Oct. 1, 2020

(30) Foreign Application Priority Data

Mar. 28, 2019 (JP) .............................. JP2019-063723

(51) Int. Cl.
*B60R 25/25* (2013.01)
*B60R 25/02* (2013.01)
*G06F 21/32* (2013.01)
*G06F 21/44* (2013.01)

(52) U.S. Cl.
CPC ............ *B60R 25/252* (2013.01); *B60R 25/02* (2013.01); *G06F 21/32* (2013.01); *G06F 21/44* (2013.01)

(58) Field of Classification Search
CPC ...................................................... B60R 25/24
See application file for complete search history.

(56) References Cited

U.S. PATENT DOCUMENTS

| | | | |
|---|---|---|---|
| 2003/0090154 A1 | 5/2003 | Takezaki et al. | |
| 2005/0193212 A1* | 9/2005 | Yuhara | G07C 9/00309 713/186 |
| 2006/0076834 A1 | 4/2006 | Kamiya | |

(Continued)

FOREIGN PATENT DOCUMENTS

| | | |
|---|---|---|
| JP | 2007-308136 A | 11/2007 |
| JP | 4428182 B2 | 3/2010 |

*Primary Examiner* — Nabil H Syed
*Assistant Examiner* — Cal J Eustaquio
(74) *Attorney, Agent, or Firm* — Oliff PLC (57) ABSTRACT

A vehicular authentication device that includes: a first processor; and a second processor. The first processor is configured to: perform a first permission to permit release of a steering lock of a vehicle in a case in which a verification of key information of the vehicle has been performed successfully, and in a case in which the steering lock has been released by the first permission, perform a second permission to permit deactivation of an immobilizer of the vehicle based on a successful verification of biometric information by the second processor.

22 Claims, 7 Drawing Sheets

(56) References Cited

U.S. PATENT DOCUMENTS

| | | | |
|---|---|---|---|
| 2015/0066238 A1* | 3/2015 | Todd | B60K 28/063 |
| | | | 701/1 |
| 2018/0105137 A1* | 4/2018 | Kawamura | B60R 25/25 |
| 2019/0226245 A1* | 7/2019 | Fabre | E05B 77/48 |
| 2020/0128203 A1* | 4/2020 | Hirono | G06T 1/00 |

* cited by examiner

| | DETERMINATION CONDITIONS | | | ENGINE ACTIVATION PERMISSION TIME | ANTI-THEFT PERFORMANCE | RESPONSIVITY |
|---|---|---|---|---|---|---|
| | POWER SOURCE TRANSITION CONDITION | → | STEERING LOCK RELEASE CONDITION | → | IMMOBILIZER DEACTIVATION CONDITION | | | |
| RELATED SYSTEM | KEY AUTHENTICATICATED | → | KEY AUTHENTICATED | → | STEERING LOCK RELEASE | EXCELLENT | GOOD | N/A |
| EXAMPLE 1 | KEY AUTHENTICATED AND FINGERPRINT AUTHENTICATED | → | KEY AUTHENTICATED AND FINGERPRINT AUTHENTICATED | → | STEERING LOCK RELEASE AND FINGERPRINT AUTHENTICATED | MODERATE TO POOR | EXCELLENT | MODERATE TO POOR |
| EXAMPLE 2 | KEY AUTHENTICATED | → | KEY AUTHENTICATED AND FINGERPRINT AUTHENTICATED | → | STEERING LOCK RELEASE AND FINGERPRINT AUTHENTICATED | MODERATE TO POOR | EXCELLENT | MODERATE TO POOR |
| PRESENT EXEMPLARY EMBODIMENT | KEY AUTHENTICATED | → | KEY AUTHENTICATED | → | STEERING LOCK RELEASE AND FINGERPRINT AUTHENTICATED | EXCELLENT TO MODERATE | EXCELLENT | EXCELLENT TO MODERATE |

FIG.5B

VEHICULAR AUTHENTICATION DEVICE AND VEHICULAR AUTHENTICATION METHOD

CROSS-REFERENCE TO RELATED APPLICATION

This application is based on and claims priority under 35 USC 119 from Japanese Patent Application No. 2019-063723 filed on Mar. 28, 2019, the disclosure of which is incorporated by reference herein.

BACKGROUND

Technical Field

The present disclosure relates to a vehicular authentication device.

Related Art

Japanese Patent No. 4428182 discloses technology in which driving intent information is detected preemptively prior to operation of an engine start switch by a driver. Release of a steering lock is instructed before the engine start switch is operated on the condition that the driving intent information has been detected. Note that Japanese Patent No. 4428182 describes using biometric authentication information in addition to detection of depression of a brake pedal as driving intent information.

Since biometric authentication is generally performed by performing verification against pre-registered biometric information, the processing takes longer the greater the amount of registered biometric information. Processing to release a steering lock is realized by driving an actuator, and this also takes a certain amount of time. In the technology disclosed in Japanese Patent No. 4428182, when biometric authentication information is employed as driving intent information, processing to release the steering lock is performed only after the biometric authentication processing has been completed. It therefore takes some time to place the vehicle in an activation-enabled state.

SUMMARY

An aspect of the disclosure is a vehicular authentication device that includes: a first processor; and a second processor. The first processor is configured to: perform a first permission to permit release of a steering lock of a vehicle in a case in which a verification of key information of the vehicle has been performed successfully, and in a case in which the steering lock has been released by the first permission, perform a second permission to permit deactivation of an immobilizer of the vehicle based on a successful verification of biometric information by the second processor.

DETAILED DESCRIPTION

Figure 1:
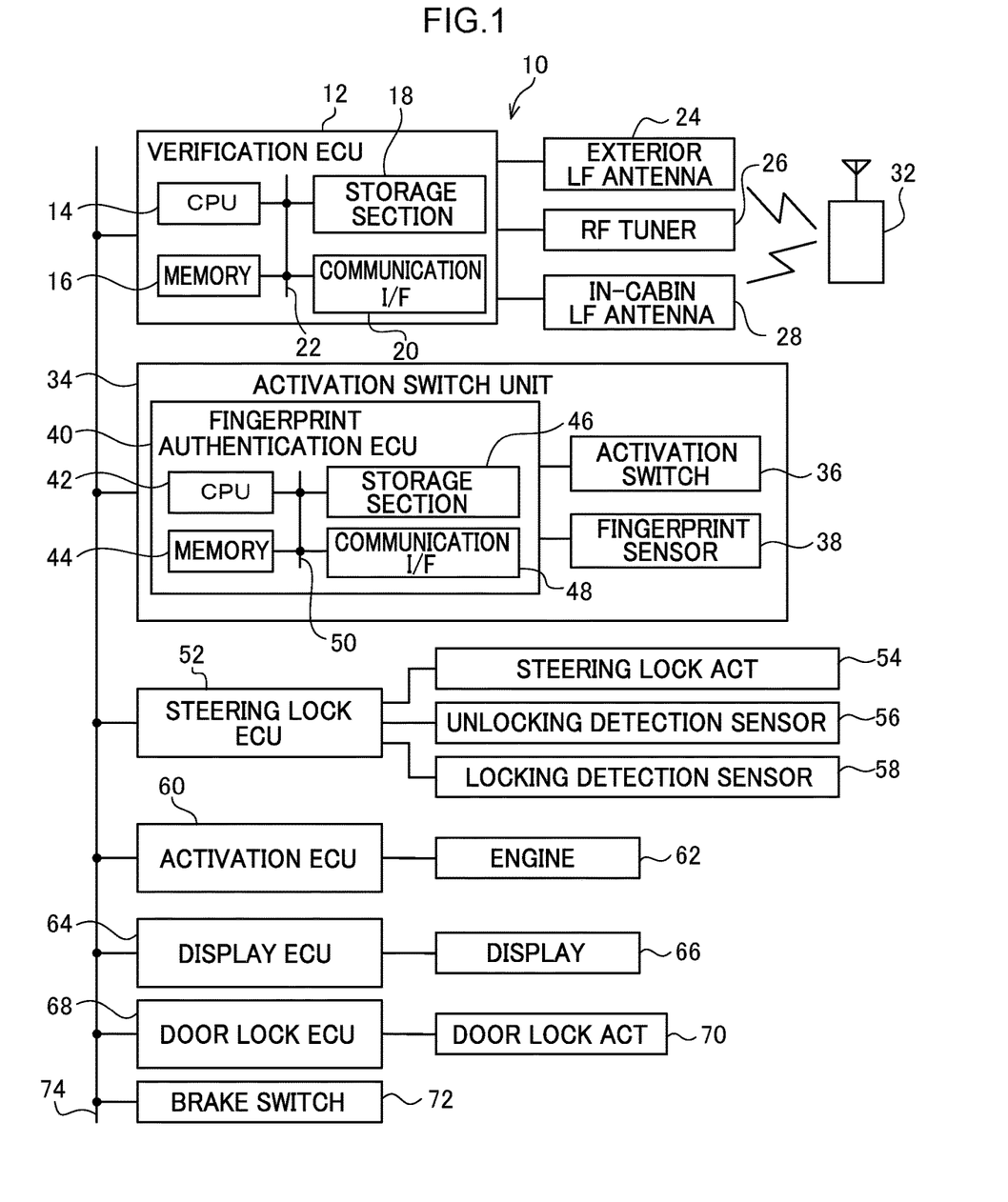
FIG. 1 is a block diagram illustrating an example of a schematic configuration of a vehicular authentication device.

Detailed explanation follows regarding an example of an exemplary embodiment of the present disclosure, with reference to the drawings. A vehicular authentication device 10 illustrated in FIG. 1 is installed in a vehicle, and includes a verification ECU 12, an activation switch unit 34, a steering lock ECU 52, an activation ECU 60, a display ECU 64, a door lock ECU 68, and a brake switch 72. The verification ECU 12, the activation switch unit 34, the steering lock ECU 52, the activation ECU 60, the display ECU 64, the door lock ECU 68, and the brake switch 72 are connected so as to be capable of communicating with each other through a communication bus 74.

The verification ECU 12 includes a central processing unit (CPU) 14, memory 16 such as read only memory (ROM) or random access memory (RAM), a non-volatile storage section 18 such as a hard disk drive (HDD) or a solid state drive (SSD), and a communication interface (I/F) 20. The CPU 14, the memory 16, the storage section 18 and the communication I/F 20 are connected so as to be capable of communicating with each other through an internal bus 22. An exterior low frequency (LF) antenna 24, a radio frequency (RF) tuner 26, and an in-cabin LF antenna 28 are respectively connected to the verification ECU 12.

The exterior LF antenna 24 is provided at the vehicle exterior, and transmits predetermined radio waves toward a smart key 32 in the possession of a user. In cases in which the user in possession of the smart key 32 is alongside the vehicle or a short distance from the vehicle, the smart key 32 receives the predetermined radio waves transmitted from the exterior LF antenna 24 and transmits key information pre-stored in the smart key 32. The key information transmitted from the smart key 32 is received by the RF tuner 26.

The in-cabin LF antenna 28 and the RF tuner 26 are provided inside the vehicle cabin. The in-cabin LF antenna 28 transmits predetermined radio waves toward the smart key 32. In cases in which the user in possession of the smart key 32 is inside the vehicle cabin, the smart key 32 receives the predetermined radio waves transmitted from the in-cabin LF antenna 28 and transmits key information. The key information transmitted from the smart key 32 is received by the RF tuner 26. When the key information is received by the RF tuner 26, the verification ECU 12 verifies the received key information against pre-registered key information. The verification ECU 12 also functions as an example of a first permitting section and a second permitting section.

The activation switch unit 34 includes an activation switch 36 (see FIG. 2) provided at a position in the vehicle cabin that enables operation from a driver's seat of the vehicle, a fingerprint sensor 38 (see FIG. 2) that detects the fingerprint of a fingertip F touching an operation face 36A provided to the activation switch 36 as fingerprint information, and a fingerprint authentication ECU 40.

Figure 2:
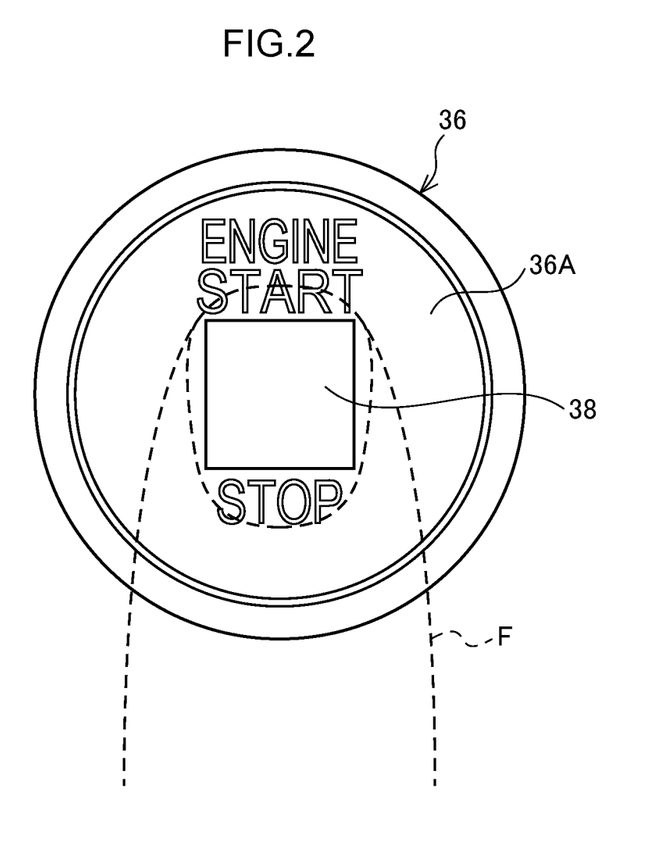
FIG. 2 is a side view illustrating an example of a fingerprint sensor provided to an activation switch unit.

The fingerprint authentication ECU 40 includes a CPU 42, memory 44, a storage section 46 and a communication I/F 48. The CPU 42, the memory 44, the storage section 46, and the communication I/F 48 are connected so as to be capable of communicating with each other through an internal bus 50. In the present exemplary embodiment, fingerprint information for each user that might sit in the driver's seat of the vehicle is registered in the storage section 46. When the fingerprint sensor 38 detects fingerprint information when the fingertip F touches the operation face 36A of the activation switch 36, the fingerprint authentication ECU 40 sequentially verifies the detected fingerprint information to one or more items of fingerprint information registered in the storage section 46. Note that the fingerprint authentication ECU 40 is an example of a biometric information verification section, and the fingerprint sensor 38 is an example of a biometric information acquisition section.

The steering lock ECU 52 includes a CPU, memory, a storage section, and a communication I/F similarly to the verification ECU 12 and so on, and is connected to a steering lock actuator (ACT) 54, an unlocking detection sensor 56, and a locking detection sensor 58. The steering lock ACT 54 is for example configured to move a locking member into and out of a recess formed in a steering shaft, and is capable of switching a steering lock between a locked state and an unlocked state. Actuation of the steering lock ACT 54 is controlled by the steering lock ECU 52. The unlocking detection sensor 56 detects an unlocked state of the steering lock, and the locking detection sensor 58 detects a locked state of the steering lock.

The activation ECU 60 includes a CPU, memory, a storage section, and a communication I/F similarly to the verification ECU 12 and so on, is electrically connected to an engine 62 of the vehicle, and controls activation of the engine 62 and the like. In the present exemplary embodiment, the vehicle may be a vehicle employing the engine 62 as the sole drive source, or may be a hybrid vehicle (HV). In cases in which the drive source of the vehicle is the engine 62, the activation ECU 60 controls fuel injection and the like of the engine 62, and in cases in which the vehicle is a hybrid vehicle, the activation ECU 60 controls activation and stopping of the engine 62 and the like.

The display ECU 64 includes a CPU, memory, a storage section, and a communication I/F similarly to the verification ECU 12 and so on, and is connected to a display 66 provided to an instrument panel of the vehicle. The display ECU 64 controls information displayed on the display 66. The display 66 is an example of a display section.

The door lock ECU 68 includes a CPU, memory, a storage section, and a communication I/F similarly to the verification ECU 12 and so on, and is connected to a door lock ACT 70. The door lock ACT 70 is capable of switching a door lock between a locked state and an unlocked state. Actuation of the door lock ACT 70 is controlled by the door lock ECU 68.

The brake switch 72 is attached to a brake pedal of the vehicle and remains in an OFF state as long as the brake pedal is not being depressed. The brake switch 72 switches to an ON state when the brake pedal is depressed. A communication control section is appended to the brake switch 72, and a signal indicating the ON or OFF state of the brake switch 72 is transmitted to the verification ECU 12 and so on through the communication bus 74.

Figure 3:
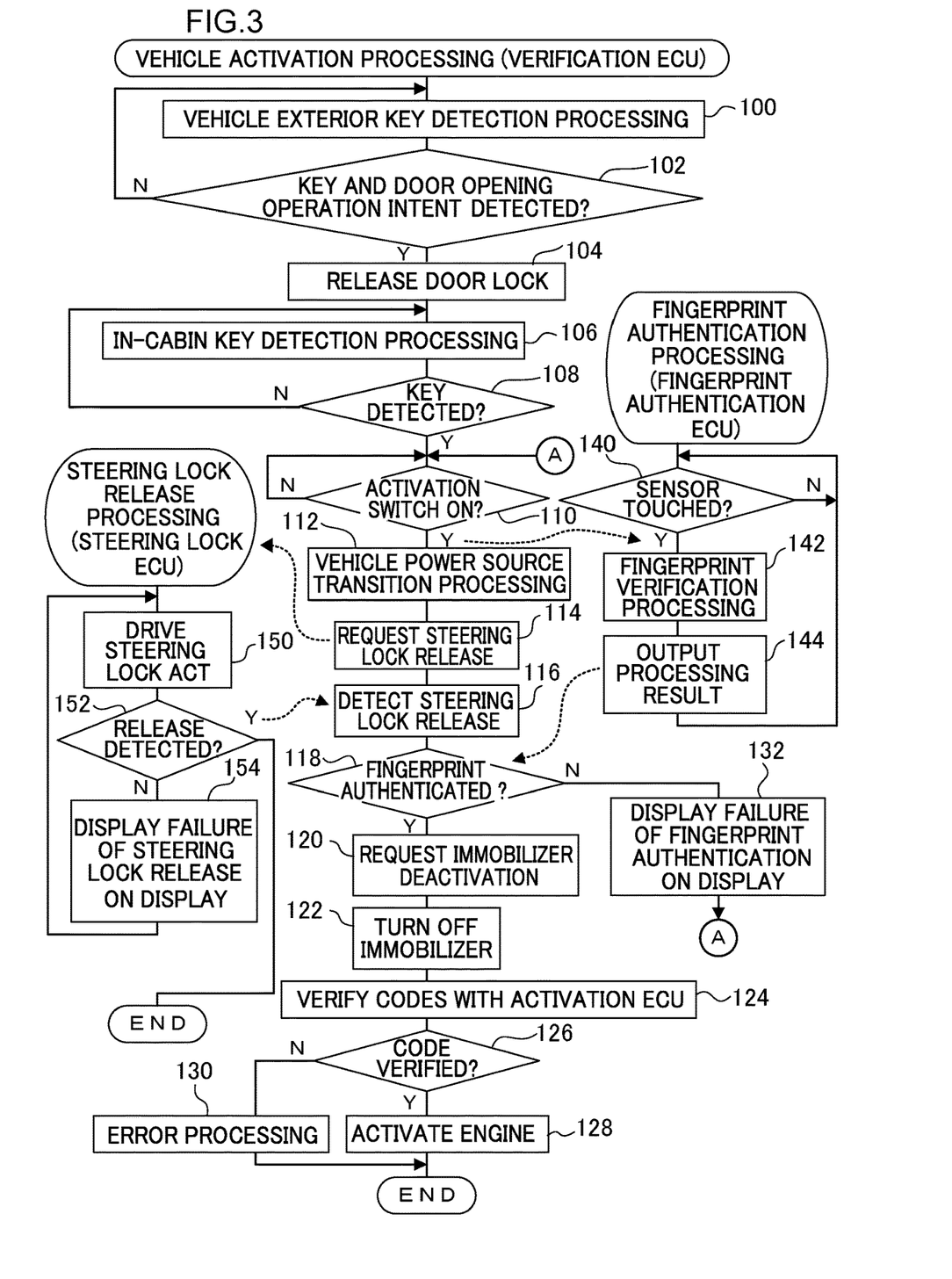
FIG. 3 is a flowchart illustrating an example of processing executed by respective ECUs.

Explanation follows regarding a flow of processing from when a user enters the vehicle until when the engine 62 of the vehicle is activated, with reference to FIG. 3. The verification ECU 12 performs the vehicle activation processing illustrated in FIG. 3. At step 100 of the vehicle activation processing, the verification ECU 12 operates in conjunction with the exterior LF antenna 24 and the RF tuner 26 to perform vehicle exterior key detection processing.

Namely, the exterior LF antenna 24 transmits predetermined radio waves to the smart key 32. In cases in which the user in possession of the smart key 32 is alongside the vehicle or a short distance from the vehicle, the key information transmitted by the smart key 32 is received by the RF tuner 26. When the verification ECU 12 receives the key information through the RF tuner 26, the verification ECU 12 verifies the received key information against pre-registered key information.

At step 102, the verification ECU 12 determines whether or not the key information has been received by the RF tuner 26 and if so whether or not the key information received by RF tuner 26 matches the pre-registered key information, and whether or not door opening operation intent, this being the intention of opening a vehicle door, has been detected. Note that detection of door opening operation intent may for example be realized by detecting a change in electrostatic capacitance due to the user gripping a door handle, or by detecting that the user has pressed a button appended to the door handle. In cases in which key information has not been received by the RF tuner 26, in cases in which key information has been received by the RF tuner 26 but the received key information does not match the pre-registered key information, and in cases in which door opening operation intent has not been detected, negative determination is made at step 102, and the vehicle exterior key detection processing of step 100 is repeated.

In cases in which a user in possession of the legitimate smart key 32 is alongside the vehicle or a short distance from the vehicle, the key information is received by the RF tuner 26 and the received key information matches the pre-registered key information. When door opening operation intent is also detected, affirmative determination is made at step 102, and processing transitions to step 104. At step 104, the verification ECU 12 instructs the door lock ECU 68 to switch the door lock to the unlocked state. The door lock ECU 68 thereby controls actuation of the door lock ACT 70 such that door lock is switched to the unlocked state, enabling the user in possession of the smart key 32 to enter the vehicle cabin.

Next, at step 106, the verification ECU 12 operates in conjunction with the in-cabin LF antenna 28 and the RF tuner 26 to perform in-cabin key detection processing. Namely, the in-cabin LF antenna 28 transmits predetermined radio waves toward the smart key 32. In cases in which the user in possession of the smart key 32 is inside the vehicle cabin, the key information transmitted from the smart key 32 is received by the RF tuner 26. When the key information is received by the RF tuner 26, the verification ECU 12 verifies the received key information against the pre-registered key information.

At step 108, the verification ECU 12 determines whether or not key information has been received by the RF tuner 26, and if so, whether or not the key information received by the RF tuner 26 matches the pre-registered key information. In cases in which key information has not been received by the RF tuner 26, and in cases in which key information has been received by the RF tuner 26 but the received key information does not match the pre-registered key information, negative determination is made at step 108, and the in-cabin key detection processing of step 106 is repeated.

In cases in which the user in possession of the legitimate smart key 32 has entered the vehicle cabin, the key information is received by the RF tuner 26 and the received key information matches the pre-registered key information. Thus, affirmative determination is made at step 108 and processing transitions to step 110. At step 110, the verification ECU 12 determines whether or not the activation switch 36 has been switched ON. The processing of step 110 is repeated as long as determination remains negative.

As an activation action in order to activate the engine 62 of the vehicle, the user who has entered the vehicle and is seated in the driver's seat switches on the activation switch 36 by touching and pressing the operation face 36A (fingerprint sensor 38) of the activation switch 36 with their fingertip F while keeping the brake pedal depressed. When the above-described activation action is performed, affirmative determination is made at step 110 and processing transitions to step 112. Then, at step 112, the verification ECU 12 performs power source transition processing to switch ON an ignition switch of the vehicle.

The fingerprint authentication ECU 40 performs fingerprint authentication processing in parallel with the vehicle activation processing by the verification ECU 12. Namely, at step 140 of the fingerprint authentication processing, the fingerprint authentication ECU 40 determines whether or not a fingertip F has touched the fingerprint sensor 38. The processing of step 140 is repeated as long as determination remains negative. If the activation action has been performed by the user and fingerprint information has been detected by the fingerprint sensor 38 as described above, affirmative determination is made at step 140 and processing transitions to step 142.

At step 142, the fingerprint authentication ECU 40 performs fingerprint verification processing by sequentially comparing the fingerprint information detected by the fingerprint sensor 38 against one or more items of fingerprint information registered in the storage section 46. The time required to perform the fingerprint verification processing depends on the amount of fingerprint information registered in the storage section 46, but takes in the region of several hundred milliseconds. Steering lock release processing, described next, is also performed in parallel with the fingerprint verification processing. When the fingerprint verification processing has been completed, at the next step 144, the fingerprint authentication ECU 40 outputs a fingerprint verification processing result ("match to registered fingerprint information" or "no match to registered fingerprint information") to the verification ECU 12.

After performing the power source transition processing at step 112, at the next step 114 the verification ECU 12 makes a request to the steering lock ECU 52 to release the steering lock. Steering lock release processing is thereby performed by the steering lock ECU 52. Note that together with steps 108 and 110, step 114 is processing corresponding to the first permitting section.

At step 150 of the steering lock release processing, the steering lock ECU 52 drives the steering lock ACT 54 such that the steering lock is switched to the unlocked state. Note that switching the steering lock to the unlocked state is for example performed by moving the lock member out of the recess formed in the steering shaft, and takes in the region of several hundred milliseconds.

Next, at step 152, the steering lock ECU 52 determines whether or not the unlocking detection sensor 56 has detected that the steering lock has switched to the unlocked state. In cases in which affirmative determination is made at step 152, the steering lock ECU 52 notifies the verification ECU 12 that the steering lock release is complete, and the steering lock release processing is ended.

Note that if the steering lock has not been switched to the unlocked state for any reason, negative determination is made at step 152 and processing transitions to step 154. At step 154, the steering lock ECU 52 uses the display ECU 64 to display that steering lock release has failed on the display 66, and processing returns to step 150. In such cases, the processing to drive the steering lock ACT 54 to switch the steering lock to the unlocked state is performed again.

After the verification ECU 12 has requested release of the steering lock at step 114, at the next step 116, the verification ECU 12 stands by for notification from the steering lock ECU 52 that the steering lock release is complete. When release of the steering lock is detected based on the notification that the steering lock release is complete from the steering lock ECU 52, processing transitions to step 118.

At step 118, the verification ECU 12 stands by until receipt of notification of the result of the fingerprint verification processing from the fingerprint authentication ECU 40. When notification of the fingerprint verification processing result is received from the fingerprint authentication ECU 40, the verification ECU 12 determines whether or not the notified result is a "match to registered fingerprint information".

In cases in which the fingerprint verification processing result notified by the fingerprint authentication ECU 40 is "no match to registered fingerprint information", negative determination is made at step 118 and processing transitions to step 132. At step 132, the verification ECU 12 uses the display ECU 64 to display that fingerprint authentication has failed on the display 66, and processing returns to step 110. In such cases, displaying that fingerprint authentication has failed prompts the user to perform the activation action again.

In cases in which a legitimate user has performed the activation action, the fingerprint verification processing result notified by the fingerprint authentication ECU 40 is a "match to registered fingerprint information", affirmative determination is made at step 118, and processing transitions to step 120. At step 120, the verification ECU 12 makes a request to deactivate an immobilizer, and at the next step 122, the verification ECU 12 turns off the immobilizer. Note that step 116 to step 120 is processing corresponding to the second permitting section.

At step 124, the verification ECU 12 communicates with the activation ECU 60 to verify a code (cypher) held by the verification ECU 12 against a code held by the activation ECU 60. At step 126, the verification ECU 12 determines whether or not the result of the code verification at step 124 is that the code solutions match. In cases in which affirmative determination is made at step 126, processing transitions to step 128. At step 128, the verification ECU 12 uses the activation ECU 60 to activate the engine 62.

In cases in which negative determination is made at step 126, processing transitions to step 130. At step 130, the verification ECU 12 performs error processing to display an error message or the like on the display 66. Thus, in cases in which the result of the code verification at step 124 is that the code solutions do not match, the engine 62 is not activated.

Figure 4:
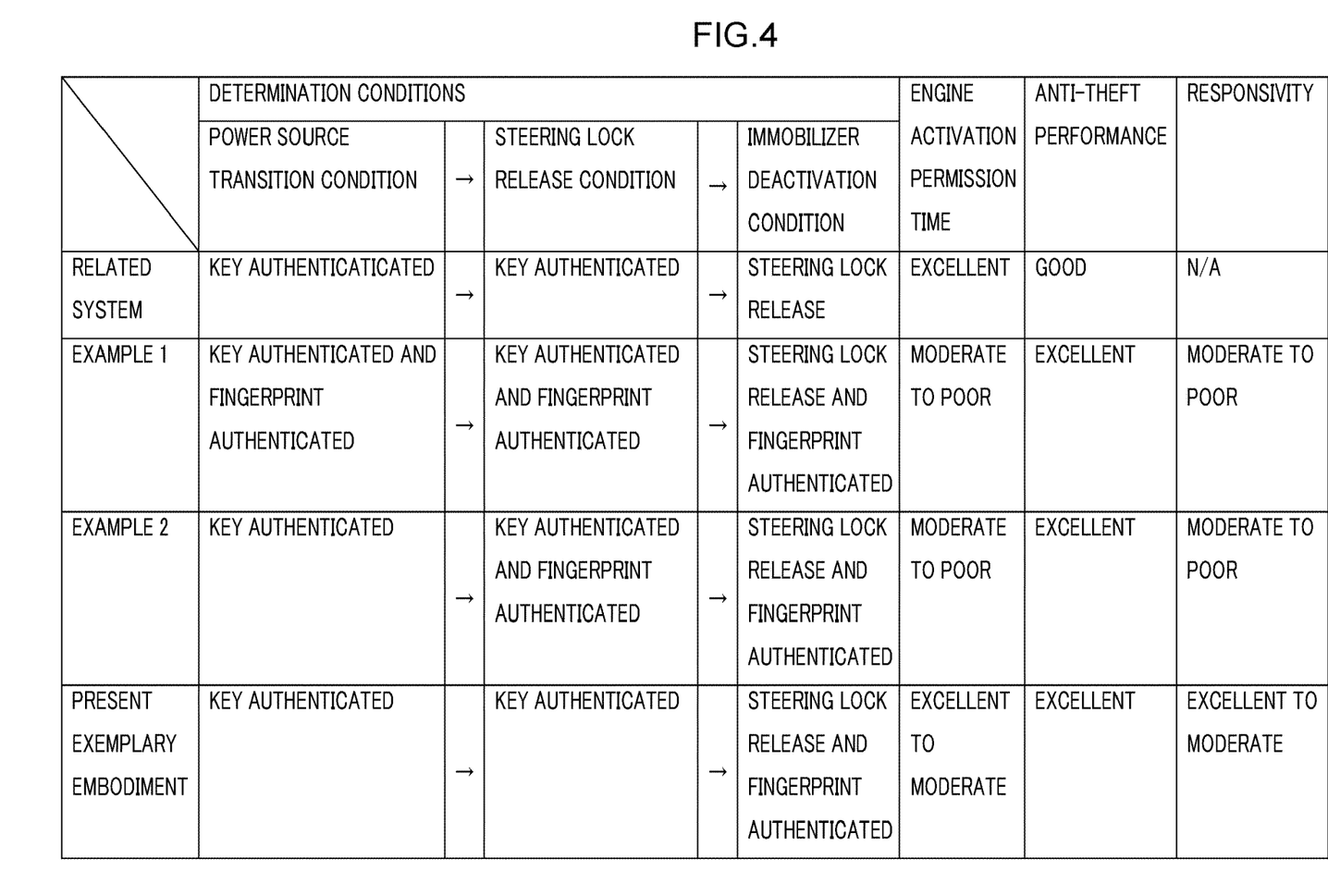
FIG. 4 is a table illustrating an example of evaluation results when Examples and an Exemplary Embodiment are compared.

In FIG. 4, a method in which user authentication is performed using only the key information of the smart key 32 is illustrated as a "related system". In the method of the related system, when the activation switch 36 has been switched ON, power source transition and steering lock release are performed in sequence on the condition that positive authentication has been made based on the key information of the smart key 32, and immobilizer deactivation is performed on the condition that the steering lock has been released. In cases in which fingerprint authentication is added to the related system in an attempt to improve anti-theft performance, conceivable implementation methods include the three methods illustrated as "Example 1", "Example 2", and "present exemplary embodiment" in FIG. 4.

Figure 5A:
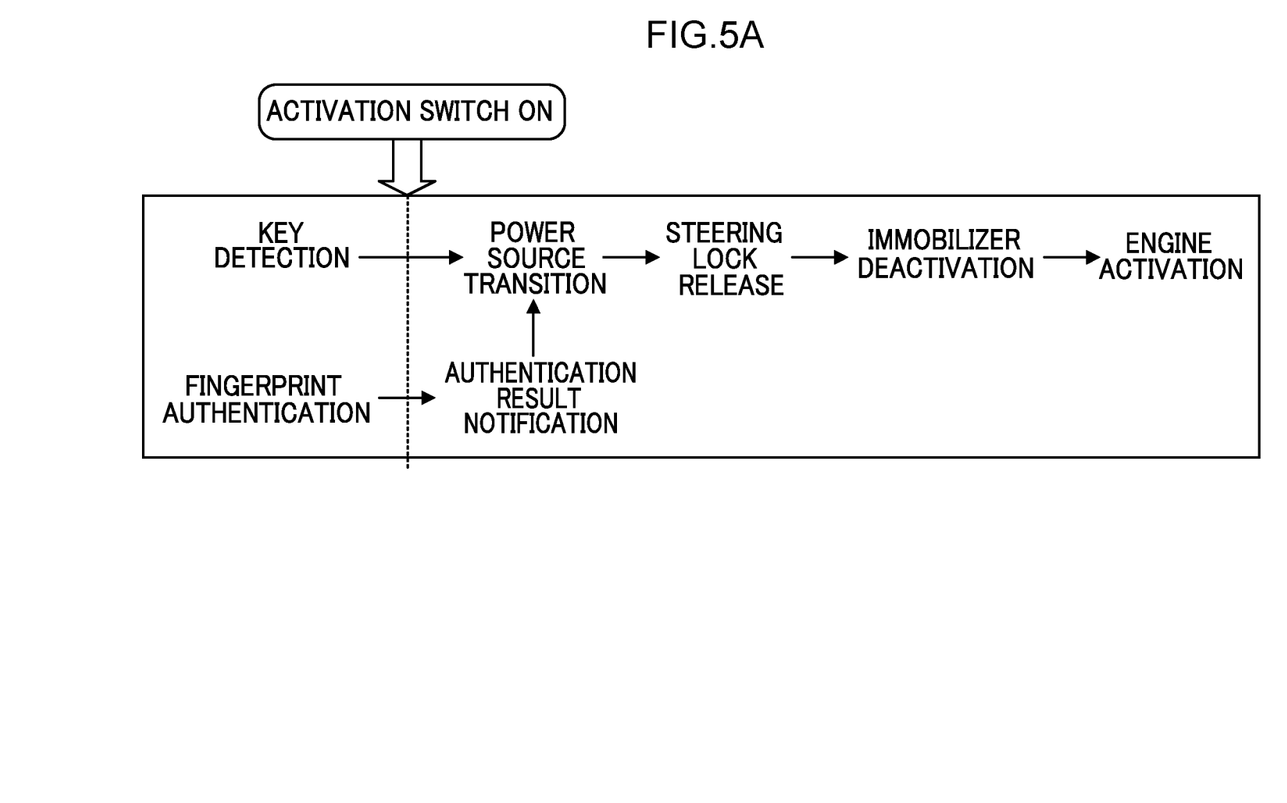
FIG. 5A is a schematic diagram illustrating an example of a determination sequence of an Example.

As illustrated in FIG. 5A, in the method of Example 1, when the activation switch 36 is switched ON, power source transition and steering lock release are performed in sequence on the conditions that positive authentication has been made based on the key information of the smart key 32 and positive fingerprint authentication has been made, and immobilizer deactivation is performed on the condition that the steering lock has been released. In this method, although adding fingerprint authentication improves anti-theft performance compared to the related system, since power source transition is not performed until after the fingerprint authentication has been completed, the engine activation permission time becomes longer as indicated by "moderate to poor" in FIG. 4, resulting in poor responsivity between switching ON the activation switch 36 and activation of the engine 62 being permitted.

Figure 5B:
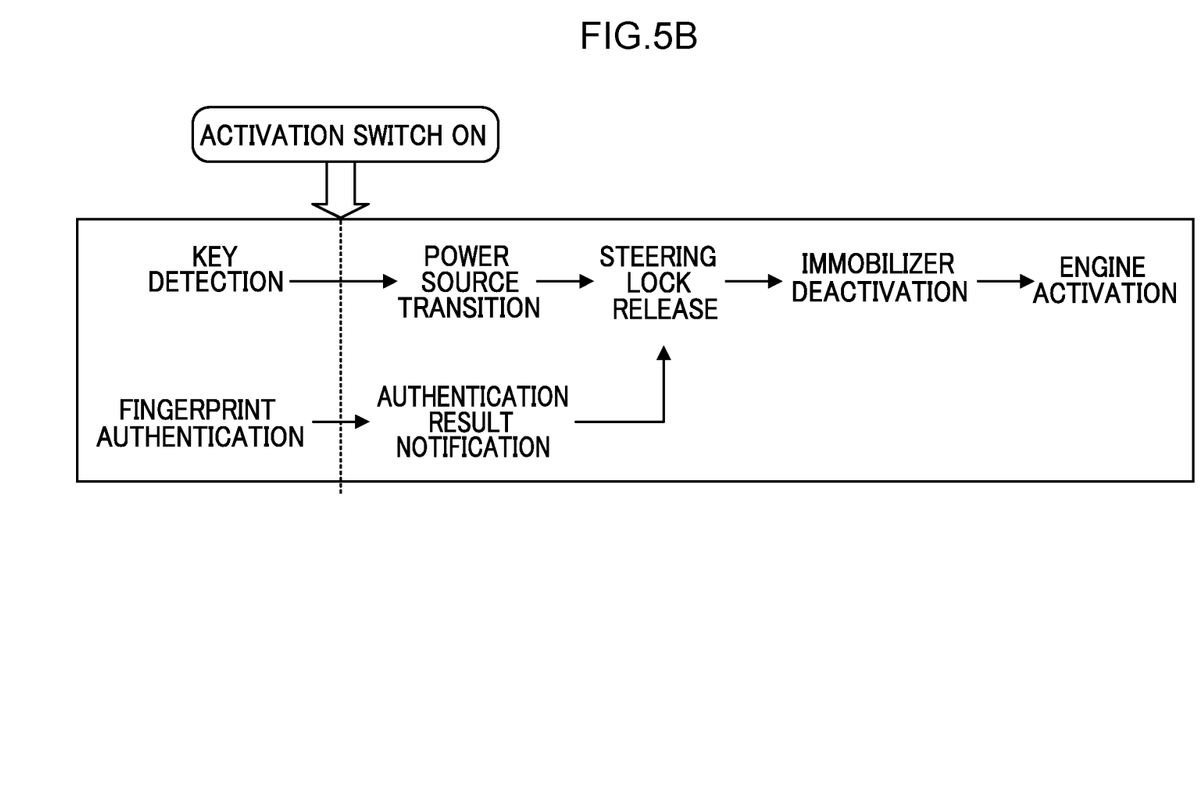
FIG. 5B is a schematic diagram illustrating an example of a determination sequence of an Example.

As illustrated in FIG. 5B, in the method of Example 2, when the activation switch 36 is switched ON, power source transition is performed on the condition that positive authentication has been made based on the key information of the smart key 32, after which steering lock release is performed on the condition that positive fingerprint authentication has been made, and immobilizer deactivation is performed on the condition that the steering lock has been released. In this method also, although anti-theft performance is improved compared to the related system, since steering lock release is not performed until after the fingerprint authentication has been completed, the Engine activation permission time becomes longer as indicated by "moderate to poor" in FIG. 4, resulting in poor responsivity between switching ON the activation switch 36 and activation of the engine 62 being permitted.

Figure 5C:
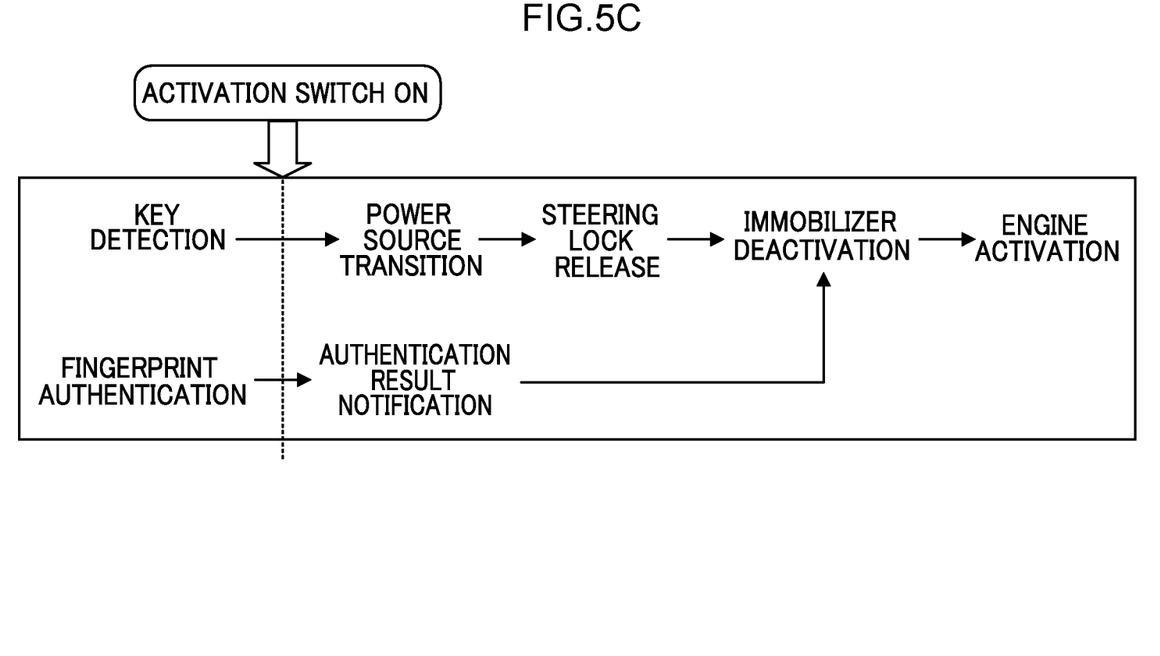
FIG. 5C is a schematic diagram illustrating an example of a determination sequence of an exemplary embodiment.

In contrast thereto, in the method of the present exemplary embodiment as previously described and illustrated in FIG. 5C, when the activation switch 36 is switched ON, power source transition and steering lock release are performed in sequence on the condition that positive authentication has been made based on the key information of the smart key 32, and immobilizer deactivation is performed on the conditions that the steering lock has been released and that positive fingerprint authentication has been made. In the method of the present exemplary embodiment, since fingerprint authentication is performed in parallel with steering lock release, the Engine activation permission time is shorter than in Example 1 and Example 2, as indicated by "excellent to moderate" in FIG. 4, resulting in improved responsivity between switching ON the activation switch 36 and activation of the engine 62 being permitted. Thus, the method of the present exemplary embodiment enables fingerprint authentication to be added to improve anti-theft performance without inconveniencing the user by negatively affecting responsivity.

As described above, in the present exemplary embodiment, when verification of the vehicle key information is successful, the steering lock ECU 52 is permitted to release the vehicle steering lock, and when the steering lock has been released, deactivation of the vehicle immobilizer is permitted based on the successful verification of fingerprint information by the fingerprint authentication ECU 40. This enables the processing to release the steering lock and the processing to verify fingerprint information to be performed in parallel, enabling the time taken to place the vehicle in an activation-enabled state to be reduced when authentication is performed using both vehicle key information and fingerprint information.

In the present exemplary embodiment, release of the steering lock is permitted in cases in which verification of the key information performed inside the vehicle cabin is successful, thereby enabling the steering lock to be released in a state in which the user is positioned inside the vehicle cabin, namely, in a state in which there is a higher possibility that the user intends to activate the vehicle.

Moreover, in the present exemplary embodiment, in cases in which in which verification of the key information is successful, release of the steering lock is permitted based on operation of the activation switch 36 of the vehicle. This enables the steering lock to be released based on the fact that the user has operated the activation switch 36, namely, based on a clear indication that the user intends to activate the vehicle.

Moreover, in the present exemplary embodiment, when the fingerprint information is acquired by the fingerprint sensor 38, the fingerprint authentication ECU 40 starts processing to verify the acquired fingerprint information to the registered fingerprint information that has been registered in advance, thereby enabling the time taken to place the vehicle in an activation-enabled state to be reduced.

Moreover, in the present exemplary embodiment, in cases in which verification of fingerprint information by the fingerprint authentication ECU 40 has failed, this is displayed on the display 66, thereby enabling the user to be prompted to perform the activation action again.

Moreover, in the present exemplary embodiment, the fingerprint sensor 38, which employs fingerprint information as biometric information, is provided to the activation switch 36. This enables the fingerprint information to be acquired without changing a series of actions taken by the user to activate the vehicle.

Note that in the above description, a vehicle employing the engine 62 as the sole drive source or a hybrid vehicle are given as examples of vehicles installed with the vehicular authentication device 10. However, the present exemplary embodiment may also be applied to an electric vehicle (EV). In such cases, instead of performing processing to activate the engine 62, for example, processing may be performed to switch ON power sources of sections relating to vehicle travel (such as a drive device including a motor to generate drive force to move the vehicle, a braking device, and a steering device).

In the above description, explanation has been given regarding a configuration in which the fingerprint sensor 38 is provided to the activation switch 36. However, there is no limitation thereto, and the fingerprint sensor 38 may be provided at a location other than the activation switch 36. However, the fingerprint sensor 38 is preferably provided at a location naturally contacted by the fingertip F of the user when the user performs a series of actions to activate the vehicle, such as the door handle or steering wheel, such that it is not necessary to alter this series of actions.

In the above description, explanation has been given regarding a configuration in which fingerprints are employed as the biometric information. However, there is no limitation thereto, and biometric information other than fingerprints, such as information relating to the face, iris, retina pattern, veins, or voice, may be employed to perform authentication.

An object of the present disclosure is to obtain a vehicular authentication device capable of reducing the time taken to place a vehicle in an activation-enabled state in cases in which authentication is performed using both vehicle key information and biometric information.

A first aspect is a vehicular authentication device that includes: a first processor; and a second processor. The first processor is configured to: perform a first permission to permit release of a steering lock of a vehicle in a case in which a verification of key information of the vehicle has been performed successfully, and in a case in which the steering lock has been released by the first permission, perform a second permission to permit deactivation of an immobilizer of the vehicle based on a successful verification of biometric information by the second processor.

In the first aspect, processing to release the steering lock of the vehicle is performed by permitting release of the steering lock in cases in which the verification of the key information of the vehicle has been performed successfully. In cases in which the steering lock has been released, processing to deactivate the immobilizer of the vehicle is performed by permitting deactivation of the immobilizer based on a successful verification of biometric information having being performed by a biometric information verification section, thereby placing the vehicle in an activation-enabled state. In this manner, processing to release the steering lock and processing to verify the biometric information can be performed in parallel in the first aspect, enabling the time taken to place the vehicle in the activation-enabled state to be reduced in a case in which authentication is performed using both the key information of the vehicle and the biometric information.

A second aspect is the vehicular authentication device of the first aspect, wherein, in the first permission, the release of the steering lock is permitted in a case in which the successful key information verification is performed inside a cabin of the vehicle.

In the second aspect, the steering lock release is permitted in cases in which the successful key information verification is performed inside the cabin of the vehicle. Accordingly, even if verification of the key information is successful at the vehicle exterior, release of the steering lock is not permitted. This thereby enables the steering lock to be released in a state in which a user is positioned inside the vehicle cabin, namely, in a state in which there is a higher possibility that the user intends to activate the vehicle.

A third aspect is the vehicular authentication device of the first or the second aspect, wherein, in the first permission, the release of the steering lock is permitted based on an operation of an activation switch of the vehicle in a case in which the key information verification has been successfully performed.

In the third aspect, in cases in which the key information verification has been successfully performed, the steering lock can be released based on operation of the activation switch by the user, namely based on a clear indication that the user intends to activate the vehicle.

A fourth aspect is the vehicular authentication device of any one of the first to the third aspect, wherein the second processor is configured to start processing to verify the biometric information against registered biometric information, which has been registered in advance, upon acquisition of the biometric information.

In the fourth aspect, the processing to verify the biometric information is started when the biometric information has been acquired by a biometric information acquisition section. Although also dependent on the timing at which the biometric information is acquired, the processing to verify the biometric information is performed in parallel with the processing to release the steering lock. This enables the time taken to place the vehicle in the activation-enabled state to be reduced.

A fifth aspect is the vehicular authentication device of any one of the first to the fourth aspect, wherein, in the second permission, in a case in which the verification of the biometric information by the second processor has failed, the failure of the verification of the biometric information is displayed on a display.

In the fifth aspect, in cases in which verification of the biometric information has failed, this is displayed on the display section, thereby enabling the user to be prompted to perform a new action to acquire the biometric information (for example an action to touch a vehicle activation switch with a fingertip) in order to perform the biometric information verification again.

A sixth aspect is the vehicular authentication device of any one of the first to the fifth aspect, wherein the biometric information comprises fingerprint information.

Although it is necessary for the user to perform an action to touch an object with a fingertip in order to acquire the fingerprint information, actions in which an object is touched with a fingertip are included in a series of actions when the user activates the vehicle, for example when operating the activation switch. Accordingly, in the sixth aspect, the fingerprint information can be acquired as the biometric information without changing the series of actions taken by the user to activate the vehicle.

A seventh aspect is the vehicular authentication device of the sixth aspect, wherein a fingerprint sensor that acquires the fingerprint information is provided at an activation switch of the vehicle.

In the seventh aspect, the biometric information (fingerprint information) is acquired by a biometric information acquisition section provided to the activation switch when the user performs an action to operate the activation switch in a series of actions to activate the vehicle. This enables the fingerprint information to be acquired as the biometric information without changing the series of actions taken by the user to activate the vehicle.

The present disclosure is capable of reducing the time taken to place the vehicle in an activation-enabled state in cases in which authentication is performed using both vehicle key information and biometric information.

The invention claimed is:

1. A vehicle comprising:
   a steering lock;
   an immobilizer;
   a first processor configured to perform a first process of:
     verifying key information of a key in a proximity of the vehicle; and
     upon successful verification of the key information, instructing the vehicle to release the steering lock; and
   a second processor configured to, in parallel with the first process, verify biometric information of a user,
   wherein the first processor is configured to, after instructing the vehicle to release the steering lock:
     receive verification of the biometric information from the second processor; and
     upon receipt of the verification of the biometric information, instruct the vehicle to deactivate the immobilizer, and
   in a case in which the verification of the biometric information by the second processor has failed, the failure of the verification of the biometric information is displayed on a display.

2. The vehicle of claim 1, wherein the key information verification is performed inside a cabin of the vehicle.

3. The vehicle of claim 1, wherein the release of the steering lock is performed upon an operation of an activation switch of the vehicle after the key information verification has been successfully performed.

4. The vehicle of claim 1, wherein the second processor is configured to verify the biometric information of the user against registered biometric information, which has been registered in advance.

5. The vehicle of claim 1, wherein the biometric information comprises fingerprint information.

6. The vehicle of claim 5, further comprising:
an activation switch; and
a fingerprint sensor at the activation switch that acquires the fingerprint information.

7. A method of controlling a vehicle having a steering lock and an immobilizer, the method comprising:
using a first processor, performing a first process of:
verifying key information of a key in a proximity of the vehicle; and
upon successful verification of the key information, instructing the vehicle to release the steering lock;
using a second processor, in parallel with the first process, verifying biometric information of a user;
using the first processor, after instructing the vehicle to release the steering lock:
receiving verification of the biometric information from the second processor; and
upon receipt of the verification of the biometric information, instructing the vehicle to deactivate the immobilizer; and
in a case in which the verification of the biometric information by the second processor has failed, displaying the failure of the verification of the biometric information on a display.

8. The method of claim 7, wherein the key information verification is performed inside a cabin of the vehicle.

9. The method of claim 7, wherein the release of the steering lock is performed upon an operation of an activation switch of the vehicle after the key information verification has been successfully performed.

10. The method of claim 7, wherein the biometric information of the user is verified against registered biometric information, which has been registered in advance.

11. The method of claim 7, wherein the biometric information comprises fingerprint information.

12. The method of claim 11, wherein the vehicle has an activation switch, and a fingerprint sensor at the activation switch that acquires the fingerprint information.

13. A vehicle comprising:
a steering lock;
an immobilizer;
an activation switch;
a fingerprint sensor at the activation switch that acquires fingerprint information of a user;
a first processor configured to perform a first process of:
verifying key information of a key in a proximity of the vehicle; and
upon successful verification of the key information, instructing the vehicle to release the steering lock; and
a second processor configured to, in parallel with the first process, verify the fingerprint information,
wherein the first processor is configured to, after instructing the vehicle to release the steering lock:
receive verification of the fingerprint information from the second processor; and
upon receipt of the verification of the fingerprint information, instruct the vehicle to deactivate the immobilizer.

14. The vehicle of claim 13, wherein the key information verification is performed inside a cabin of the vehicle.

15. The vehicle of claim 13, wherein the release of the steering lock is performed upon an operation of an activation switch of the vehicle after the key information verification has been successfully performed.

16. The vehicle of claim 13, wherein the second processor is configured to verify the fingerprint information of the user against registered fingerprint information, which has been registered in advance.

17. The vehicle of claim 13, wherein in a case in which the verification of the fingerprint information by the second processor has failed, the failure of the verification of the fingerprint information is displayed on a display.

18. A method of controlling a vehicle having a steering lock, an immobilizer, an activation switch, and a fingerprint sensor at the activation switch, the method comprising:
using the fingerprint sensor, acquiring fingerprint information of a user;
using a first processor, performing a first process of:
verifying key information of a key in a proximity of the vehicle; and
upon successful verification of the key information, instructing the vehicle to release the steering lock;
using a second processor, in parallel with the first process, verifying the fingerprint information; and
using the first processor, after instructing the vehicle to release the steering lock:
receiving verification of the fingerprint information from the second processor; and
upon receipt of the verification of the fingerprint information, instructing the vehicle to deactivate the immobilizer.

19. The method of claim 18, wherein the key information verification is performed inside a cabin of the vehicle.

20. The method of claim 18, wherein the release of the steering lock is performed upon an operation of an activation switch of the vehicle after the key information verification has been successfully performed.

21. The method of claim 18, wherein the fingerprint information of the user is verified against registered fingerprint information, which has been registered in advance.

22. The method of claim 18, further comprising:
in a case in which the verification of the fingerprint information by the second processor has failed, displaying the failure of the verification of the fingerprint on a display.

* * * * *